Feb. 8, 1938. F. A. OLMSTEAD 2,107,545
ANTISKID DEVICE
Filed April 16, 1934
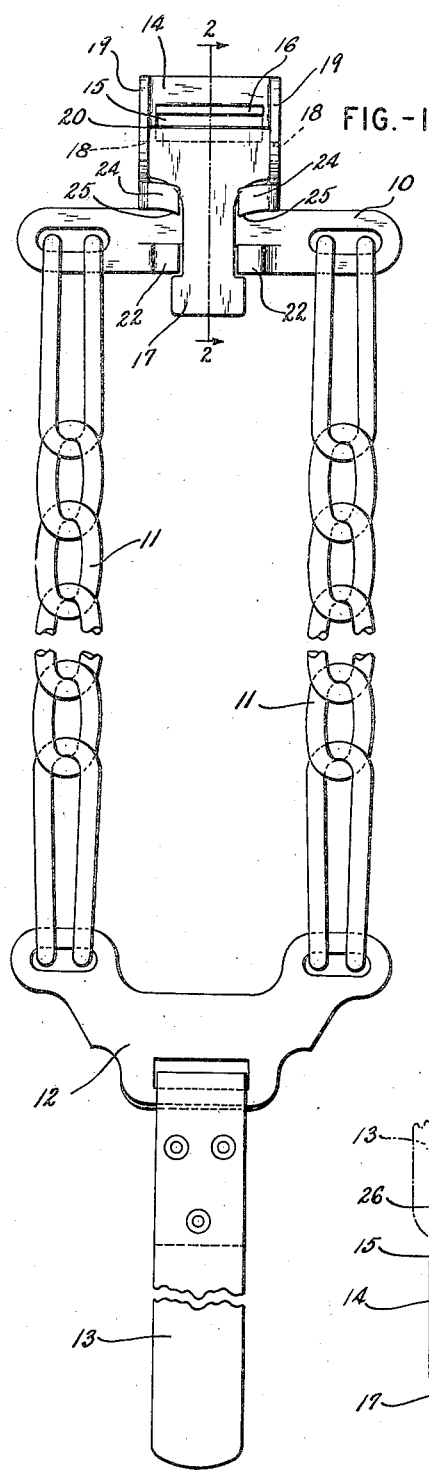
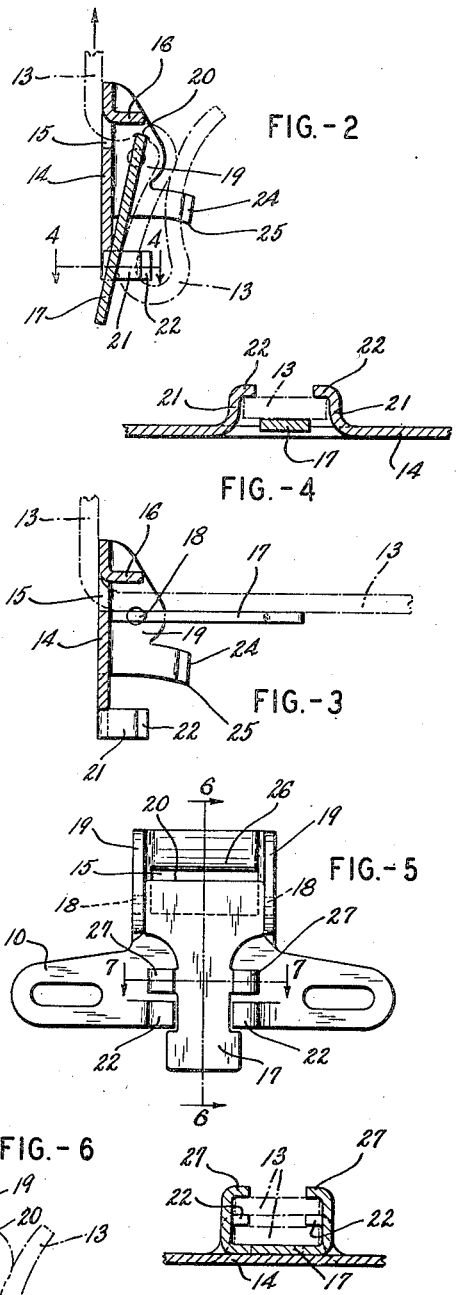
INVENTOR
FREDERICK A. OLMSTEAD
BY
Brockett, Hyde, Higley + Meyer
ATTORNEYS Patented Feb. 8, 1938

2,107,545

UNITED STATES PATENT OFFICE 2,107,545

ANTISKID DEVICE

Frederick A. Olmstead, Cleveland Heights, Ohio, assignor to The Hodell Chain Company, a corporation of Ohio Application April 16, 1934, Serial No. 720,678

13 Claims. (Cl. 24—193)

This invention relates to clamping means and more particularly to means for clamping an antiskid device on the tire of a vehicle.

An object of the invention is to provide a clamping device which is cheap to construct and both simple and efficient in its operation.

A further object of the invention is to provide my improved clamp in combination with a device adapted to retain chains or other flexible traction members in position about the tire of a vehicle, primarily for temporary use in extricating the vehicle from places where traction is poor, although the device may be used more or less permanently, as desired.

Other objects and advantages of the invention will be apparent from the accompanying description together with the drawing and the essential features will be summarized in the claims.

In the drawing, Fig. 1 is a plan view of my clamping device in combination with an antiskid chain for use on automobile tires; Fig. 2 is a sectional view along the line 2—2 of Fig. 1, with the strap secured in position; Fig. 3 is a sectional view similar to Fig. 2 before the clamping lever is moved to its gripping position; Fig. 4 is a sectional view along the line 4—4 of Fig. 2; while Figs. 5, 6 and 7 are views of a modification, Figs. 6 and 7 being sections along lines 6—6 and 7—7 of Fig. 5.

Flexible traction members of the type illustrated are sold to the public in place of more cumbersome and expensive devices. They provide an article which makes a selling appeal because of its relative cheapness and ease in handling. However, such attributes are worthless if the device is not dependable, for a vehicle user places traction devices on the vehicle wheels only because an emergency has arisen. His safety, even his life, may depend on the traction devices remaining in place and properly performing their function. The improved device here disclosed is therefore constructed with these points in mind. It is cheap to construct; it is easy to apply to a vehicle wheel; and finally it is clamped in position so that it cannot accidentally become loosened, so as to fulfill its function as a safety device.

My invention comprises in general a flexible traction member having a strap secured to one end and clamping means for the strap secured to its other end. The clamping means comprises a body member, a clamping lever pivotally supported on the body member, the clamping lever and body member being so arranged that a gripping edge portion of the lever is adapted to be pressed into and embedded in the strap when the lever is moved toward the body member. In this position the free end of the lever preferably lies closely adjacent the body member. The free end of the strap is then bent along the outer face of the lever and beneath portions of the body member formed to hold the strap against the lever in retaining position. Thus, while the strap is neatly folded and held in confined position, it also holds or locks the lever in clamping position.

While my clamping means is adapted to various uses, it is particularly adapted for use in connection with a tire chain or other traction member such as is ordinarily clamped temporarily about the tire of an automobile to extricate the vehicle from a position where traction is poor, or for general non-skid use. To this end the buckle or clamping member 10 is attached to one or more traction members, such as cross chains 11, to the other end of which a strap-fastening member 12 is attached, the whole assembly being placed about a vehicle tire and the strap 13 passed about the rim between the spokes and secured to the clamp 10.

The novel features of my invention are more particularly associated with the clamping member 10. The body member is essentially a flat plate 14, slotted as at 15 to receive the end of the strap. Along one side of the slot is a flange or shoulder 16 formed in any desired manner but preferably from the portion of the body member cut from the metal to form the opening 15. On the same face of the body member as the shoulder but on the opposite side of the slot a clamping lever 17 is mounted on pivots 18, which are spaced from the body member and located along a line substantially parallel to the edge of slot 15 opposite the shoulder. The pivotal supports for the clamping lever are preferably formed by bending up ears 19 from the metal of the body.

The lever 17 is preferably a flat, rigid member with a gripping edge portion 20 on one side of the pivotal supports, the said gripping edge being substantially the full width of the strap or wider. The free end of the lever is held in the position of Fig. 3 while the strap is being inserted through the slotted opening and is thereafter moved to a position normal to the strap and then slightly beyond the normal to the clamping position of Fig. 2, from which it will be noted that, in clamping position, the gripping edge 20 of the lever is spaced from the body member a greater distance than the pivots 18 so that a pull upon the strap in the direction of the arrow tends to clamp the strap more securely in position.

With the lever thus clamped, the strap is now folded along the outer face of the lever and is led to a position against the free end of the lever beneath portions 21 of the body member. These portions are preferably projections struck up from the metal of the body with the ends spaced apart a distance sufficient for the lever 17 to pass between them, as indicated in Fig. 4. These members also have, at their outer ends, portions 22 adapted to overlie the edges only of the strap. When the free end of the strap is passed between lever 17 and the projecting clamp portions 22, the lever is positively secured against release until the strap has been first removed. To this end the strap 13, while made of material sufficiently flexible longitudinally to permit its manipulation in the manner described, is nevertheless thick and sufficiently stiff transversely to prevent the strap being easily folded and lifted upward when in the position of Fig. 4, or in other words, the transverse stiffness of the strap and the spacing of the projections 22 is so arranged that the strap can only be removed longitudinally. This effectually prevents accidental loosening of the clamp by striking an object or by continuous jarring.

With the antiskid device clamped in position as thus described, it sometimes happens that the free end of the strap is of sufficient length to be troublesome if left loose. To further secure the loose end of the strap I may provide other clamping portions 24 located between the ends of the clamping lever and spaced above the body member sufficiently to permit the strap to be folded back upon itself, as shown in Fig. 2, so that the clamping portions 24 retain a double thickness of the strap beneath them. These clamping portions 24 are easily struck up from the metal of the body member and may be formed integral with the ear portions 19, as shown. The portions 24 may be bent away from the gripping edge and toward the free end of the lever as shown at 25, Fig. 1, where desirable to provide a stronger lever section near the pivot supports.

The modification illustrated in Figs. 5 to 7 includes several additional features which may be made a part of my device. For instance the shoulder 16 may be dispensed with and a portion 26 of the body member lying along one edge of the slot may be arranged to coact with a gripping part of the locking lever, it being sufficient to provide coacting parts adapted to embed a portion of the lever in the strap as the lever is moved toward locking position.

These views also illustrate another construction adapted to hold the otherwise loose end of the strap, to wit, projections 27 on the lever 17 which perform the functions of the ear portions 24 previously described.

In the modification of Figs. 5 to 7 the lever in clamping position may be substantially normal to the strap at its clamped point in contradistinction to the form already described where the gripping end of the lever moves past the normal into clamping position, but such a form is satisfactory where the gripping edge is sufficiently embedded in the strap.

While I have indicated that the various portions connected with the body member may be easily struck up from the metal thereof, it will be understood that similar portions could be formed by casting, welding or otherwise. However, in the form shown the clamping device comprises but two pieces, namely, the body member with its various openings and projections, as described, and the clamping lever formed as shown with the pivot members stamped out integral therewith. The device is therefore very cheaply constructed and, as described, is very easily clamped and unclamped in use, yet it is dependable as a safety device.

What I claim is:

1. In a buckle of the character described, a frame having a base for receiving and supporting a strap, a cam lever pivoted to the frame for clamping and releasing the strap as the lever is rocked in reverse directions, the end portion of the strap being folded upon itself into two superposed layers both lying along the outer face of the lever while the latter is in its clamping position, and means for confining said two layers of the lever in their position over the strap to lock the lever in its clamping position and prevent escape of the strap.

2. In a buckle of the character described, a frame provided with a strap supporting base and with laterally spaced lugs, a cam lever pivoted on the frame and movable through the space between the lugs toward and from the base for clamping and releasing the strap as the lever is rocked in reverse directions, the free end of the clamped strap being inserted under the lugs and along the outer face of the lever when the latter is in its clamping position for holding said lever in that position, and said lugs being spaced from the base a sufficient distance to receive beneath them two thicknesses of the strap, the strap end being folded upon itself into two superposed layers both of which are confined by said lugs.

3. In a buckle of the character described, a frame having a base for receiving and supporting a strap member, strap clamping means secured to said base and including an operating lever having strap release and strap clamping positions, means for securing a portion of the strap in position over the lever to lock the same in clamping position, and additional means for securing the free end of the strap in a position folded back over an adjacent portion thereof.

4. In a buckle of the character described, a frame having a base for receiving and supporting a strap member, strap clamping means secured to said base and including an operating lever having strap release and strap clamping positions, a set of primary lugs lying above and thereby securing a first portion of the strap in position over the lever to lock the same in clamping position, and a set of secondary lugs lying above and thereby securing the free end of the strap in a position folded back over the first portion thereof.

5. In a buckle of the character described, a frame having a base for receiving and supporting a strap member, strap clamping means secured to said base and including an operating lever having strap release and strap clamping positions, a set of primary lugs lying above and thereby securing a first portion of the strap in position over the lever to lock the same in clamping position, and a set of secondary lugs lying above and thereby securing the free end of the strap in a position folded back over the first portion thereof, one set of said lugs being attached to the base and the other set of said lugs being attached to the lever.

6. In a buckle of the character described, a base plate having a strap receiving slot one edge portion of which is bent out of the plane of the plate, a plate form two-armed lever pivoted to the base on an axis spaced from the base, said lever having one edge lying opposite to and in clamping relation with the bent edge of the base plate when the lever is parallel with the base plate and the clamping edge of said lever moving toward the base as the lever moves toward release position, and means for confining the free end of the strap over the lever when the latter is in strap clamping position.

7. In a buckle of the character described, a base plate having a strap receiving slot one edge portion of which is bent out of the plane of the plate, a plate form two-armed lever pivoted to the base on an axis spaced from the base, said lever having one edge lying opposite to and in clamping relation with the bent edge of the base plate when the lever is parallel with the base plate and the clamping edge of said lever moving toward the base as the lever moves toward release position, means on the base plate for securing a first portion of the strap in a position overlying the lever when said lever is in clamping position, and additional means for confining a returned end portion of the strap over the first portion thereof.

8. In a buckle of the character described, a base plate having a strap receiving slot one edge portion of which is bent out of the plane of the plate, a plate form two-armed lever pivoted to the base with one edge lying opposite to and in clamping relation with the bent edge of the base plate when the lever is parallel with the base plate, the pivotal axis of said lever being spaced from the base plate and two sets of lugs, one mounted on the base plate and the other on the lever, for respectively confining beneath them two superposed portions of the strap, said two portions of the strap lying over the lever and thereby locking the same in clamping position.

9. A strap securing device comprising a base having a slot therein designed to receive said strap, a hook member formed on said base member adjacent said slot, and a pivoted lever for gripping said strap and clamping it against a side of said slot and said hook member.

10. A strap securing device comprising a base providing two spaced gripping parts, a movable member operably associated with said base for gripping and forcing a portion of said strap into gripping engagement with said two spaced gripping parts of said base, said member being operable to produce at least one bend in said strap.

11. The device defined in claim 10, wherein another portion of said strap is operable to retain said member in gripping position.

12. In a strap securing device, a base having a slot therein, means, forming a wall of said slot, for gripping said strap, a lever carried on said base and designed to grip said strap, a second member on said base designed to cooperate with one end of said lever to grip said strap, and a final gripping member on said base designed to secure the free end of said strap and retain it in contact with the other end of said lever to maintain the lever in locking position.

13. Strap securing and tightening means comprising a member having a strap-receiving slot, means overlying said slot designed to guide said strap while tightening the strap, a second member designed to grip said strap between said slot and said guide and clamp said strap between said second member and said guide, a staple secured to said first mentioned member and a loop formed in the end of said strap by bending the strap upon itself, said loop being disposed beneath said staple and in contact with said second member to thereby retain said loop and secure said second member in gripping position.

FREDERICK A. OLMSTEAD.